United States Patent [19]

Chapman

[11] 3,862,824

[45] Jan. 28, 1975

[54] MEANS FOR INDICATING COMPLETION OF STERILISATION PROCESSES

[76] Inventor: Arthur William Chapman, 53 Ranmoor Cres., Sheffield, England

[22] Filed: May 30, 1974

[21] Appl. No.: 474,609

[52] U.S. Cl. ............................ 23/253 TP, 252/408
[51] Int. Cl. ...................... G01n 31/22, G01n 21/08
[58] Field of Search ........ 23/253 TP, 230 R, 230 B; 252/408; 116/114 AM; 195/103.5, 127; 21/56, DIG. 4

[56] References Cited
UNITED STATES PATENTS

| | | | |
|---|---|---|---|
| 3,346,464 | 10/1967 | Ernst | 23/253 TP |
| 3,360,338 | 12/1967 | Edenbaum | 23/253 TP |
| 3,704,096 | 11/1972 | Verses et al. | 23/253 TP |

Primary Examiner—R. E. Serwin
Attorney, Agent, or Firm—Lowe, King & Price

[57] ABSTRACT

Steam sterilisation indicator means for introducing into surgical and other materials to show that thorough penetration of the material by steam has been effected and that it has been exposed to the steam at an adequate temperature for an adequate time comprises a carrier on which is deposited a mixture of a carboxylic acid which loses carbon dioxide under steam sterilisation conditions together with one of its salts which on exposure to steam produces alkali and causes a continuous change of the pH value in the alkaline direction as exposure to steam continues, and a pH indicator deposited on the carrier and which will undergo changes in colour as the pH changes, to indicate the extent of exposure to steam which has occurred.

7 Claims, No Drawings

MEANS FOR INDICATING COMPLETION OF STERILISATION PROCESSES

This invention relates to means for indicating completion of sterilisation processes, more particularly of surgical and other materials by steam, which may be under pressure, and has for its object the provision of steam sterilisation indicator means which can be introduced into the material to show that thorough penetration of the material by steam has been effected and that it has been exposed to the steam at an adequate temperature for an adequate time.

According to the present invention, steam sterilisation indicator means comprises a carrier, a mixture deposited on the carrier and consisting of a carboxylic acid which loses carbon dioxide under steam sterilisation conditions together with one of its salts which on exposure to steam produces alkali and causes a continuous change of the pH value in the alkaline direction as exposure to steam continues, and a pH indicator deposited on the carrier and which will undergo changes in colour as the pH changes, to indicate the extent of exposure to steam which has occurred.

Many carboxylic acids or their salts lose carbon dioxide when heated, either alone or in solution to give the corresponding decarboxylated products, thus:

$$R.COOH \rightarrow RH + CO_2$$

or under suitable conditions its salt:

$$2R.COONa + H_2O \rightarrow 2RG + Na_2CO_3 + CO_2$$

The ease with which this decomposition takes place varies greatly with the nature of the carboxylic acid, but the change is favoured by the presence of "negative" groups in the molecule. Thus malonic acid decomposes at or above its melting point into acetic acid and carbon dioxide,

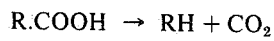

nitroacetic acid (and its salts) still more readily breaks down into nitromethane and carbon dioxide thus:

$$CH_2(NO_2)COOH \rightarrow CH_2NO_2 + CO_2$$

and trichloracetic acid (or its salts) on heating in solution decomposes with production of chloroform, e.g., $$CCl_3COOH \rightarrow CHCl_3 + CO_2$$

Steam sterilisation is normally conducted at temperatures between 100° and 150°C (more particularly between 120° and 140°C) and a convenient acid for these temperatures is 2,4-dihydroxybenzoic acid, which on boiling its aqueous solution slowly breaks down into resorcinol and $CO_2$.

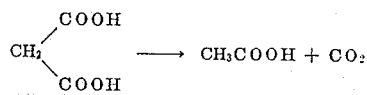

Under similar conditions the sodium or potassium salt of this acid will produce alkali and resorcinol and the $P_H$ of a mixture of the acid and its salt will change continuously in the alkaline direction on suitable heating in steam.

EXAMPLE 15.4 grams of 2.4-dihydroxybenzoic acid are dissolved in 200 cc. of industrial methylated spirit. To 100 cc. of this solution are added 30 cc. of a saturated solution of methyl red in alcohol (e.g., industrial methylated spirit), 20 cc. of a 0.5 percent solution of bromocresol green in alcohol and 12 cc. of 0.5 percent solution of picric acid in alcohol. 16 cc. of N/1 aqueous sodium hydroxide is added to convert part of the 2, 4-dihydroxybenzoic acid into its sodium salt. This mixed solution is then absorbed by porous paper, e.g., filter paper or other porous material and dried by gentle heat, e.g., on a hot plate. The resultant paper is bright red in colour, and pieces of it are sealed into transparent plastic envelopes (e.g., nylon) which are permeable to steam but retard the penetration and prevent the material on the carrier from being washed away.

When the indicator means described above is heated in dry air at 120° C no change is visible in 4 hours. However, when it is exposed to steam at 120° C in an autoclave the decarboxylation reaction takes place and is evidenced by the changes of colour of the indicator means:

after 5 minutes a light pink, after 10 minutes the pink colour begins to disappear and a green colour to appear, after 15 minutes the pink colour has disappeared and is replaced by green which on further heating slowly intensifies and becomes bluish green, after 1 hour the indicator has turned brownish green, in steam at 100°C the change is much slower and exposure for 2 hours or more is required before a green colour is reached.

By varying the composition of the solution, particularly with regard to the relative proportions of the acid and its salt, the rate of change of colour can be adjusted to suit various conditions of time and temperature.

The employment of other carboxylic acids and/or their salts affords a wide range of sensitivity.

By varying the nature of the indicator dyes employed both the colours and the change points can be varied. An alternative pH indicator is methyl red and bromothymol blue.

The indicator means is preferably placed in the least accessible part of the material to be sterilised, so that it will indicate the efficacy of the sterilisation process.

The indicator means can also be employed to measure the progress of other processes involving exposure to steam.

What I claim is:

1. Steam sterilisation indicator means comprising a carrier, a mixture deposited on the carrier and consisting of a carboxylic acid which loses carbon dioxide under steam sterilising conditions together with one of its salts which on exposure to steam produces alkali and causes a continuous change of the pH value in the alkaline direction as exposure to steam continues, and a pH indicator deposited on the carrier and which will undergo changes in colour as the pH changes, to indicate the extent of exposure to steam which has occurred.

2. Indicator means as in claim 1, wherein the acid is 2,4-dihydroxybenzoic acid.

3. Indicator means as in claim 2, wherein the pH indicator consists of methyl red, bromo-cresol green and picric acid.

4. Indicator means as in claim 2, wherein the pH indicator consists of methyl red and bromothymol blue.

5. Indicator means as in claim 1, wherein the carrier is a piece of filter paper or fabric of a porous nature.

6. Indicator means as in claim 1, wherein the carrier having the mixture of a carboxylic acid and one of its salts and the pH indicator deposited thereon is enclosed in a transparent plastics envelope having sufficient permeability and thickness to retard penetration by steam and also prevent the materials deposited on the carrier from being washed away.

7. Indicator means as in claim 6, wherein the plastics envelope is formed of nylon.

* * * * *